No. 673,561. Patented May 7, 1901.
G. A. MANWARING.
ART OF REFRIGERATION.
(Application filed Apr. 6, 1900.)
(No Model.)
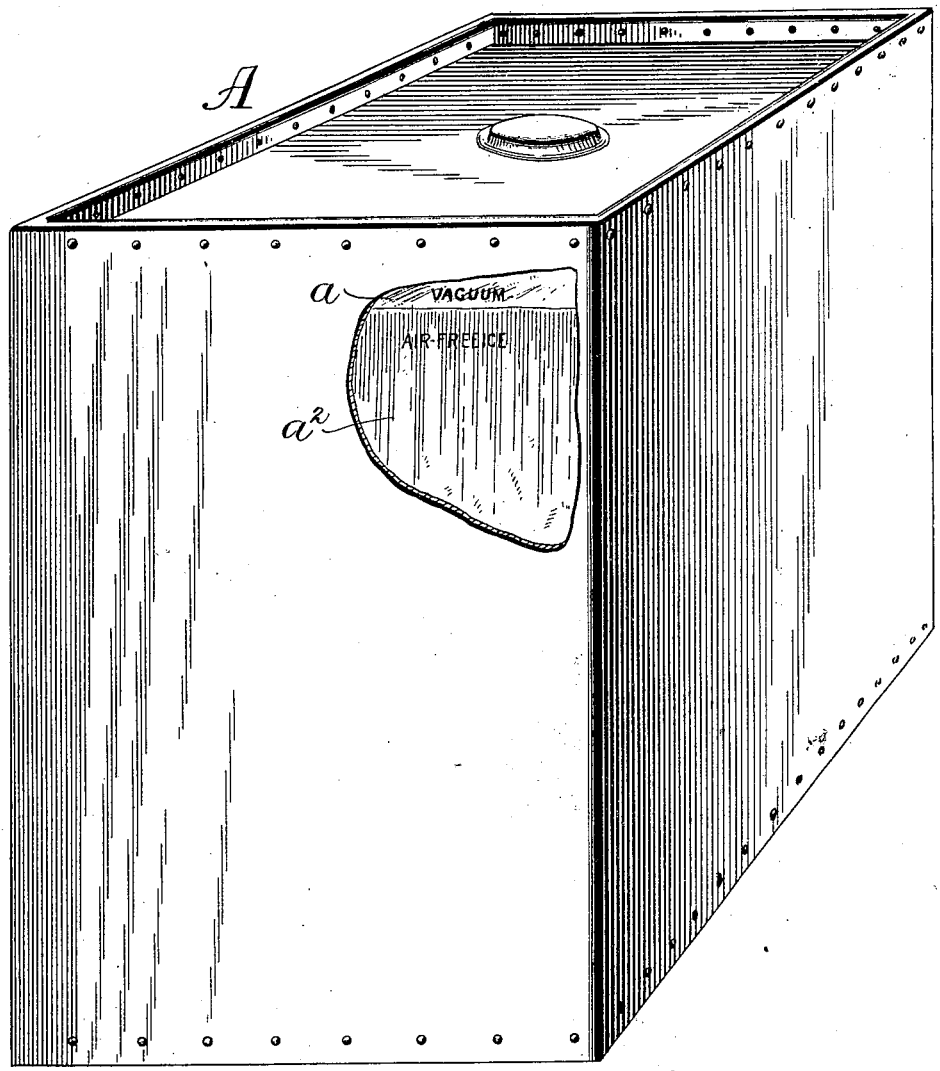
WITNESSES:
L. C. Hills
R. M. Elliott.
INVENTOR:
George A. Manwaring,
by R. S. Dyrenforth
his attorney.

UNITED STATES PATENT OFFICE.

GEORGE A. MANWARING, OF MERCHANTVILLE, NEW JERSEY.

ART OF REFRIGERATION.

SPECIFICATION forming part of Letters Patent No. 673,561, dated May 7, 1901.

Application filed April 6, 1900. Serial No. 11,873. (No specimens.)

*To all whom it may concern:*

Be it known that I, GEORGE A. MANWARING, a citizen of the United States, residing at Merchantville, in the county of Camden and State of New Jersey, have invented certain new and useful Improvements in the Art of Refrigeration; and I do hereby declare the following to be a full, clear, and exact description of the invention, such as will enable others skilled in the art to which it appertains to make and use the same.

The object is to present frozen liquid in a containing vessel at any desired low degree of temperature without danger of rupturing the vessel in which the ice is formed.

With this object in view the invention consists in the method of freezing liquid in a containing vessel and in the new article of commerce produced, all as hereinafter fully described and claimed.

In the accompanying drawing, forming a part of this specification, I have illustrated a form of ice-containing vessel, the figure being a view in perspective with a portion of one side of the vessel broken away to exhibit the contained ice and the vacuum-space above it.

In carrying my invention into effect I take a vessel of any size and shape and constructed of any suitable material, preferably of metal, and partly fill the same with a liquid to be frozen, the vessel being closed, except that it has an escape opening or vent, subsequently to be sealed. The vessel A, which may be of the style and constructed in the manner shown in the drawing, with its contained liquid, is then subjected to the requisite degree of heat to cause the contained liquid to give off a vapor, which fills the space above the liquid and operates to drive out or displace the contained air, this operation also serving to eliminate a great portion of the air contained within the liquid. The vessel is then hermetically sealed, and upon condensation of the vapor referred to there will be a partial vacuum-space in the vessel, as shown at $a$. The vessel is then either partly or wholly immersed in a suitable freezing-bath and its contained liquid frozen, presenting a mass of ice, (designated by $a^2$.)

The provision of a more or less perfect vacuum within the vessel will effectually obviate any danger of rupture or distortion of the vessel during the freezing, while, as is well known, the elimination of the air from the liquid also tends to hasten congelation.

The degree of heat to which the vessel may be subjected to produce the partial vacuum may be just sufficient to produce a vapor, or the liquid in the vessel may be brought to the boiling-point.

Having thus fully described my invention, what I claim as new, and desire to secure by Letters Patent of the United States, is—

1. The method of producing a refrigerating-body, comprising an air-exhausted holder permanently impervious to intrusion of any extraneous fluid and containing a readily-freezable liquid, which consists in filling a suitable vessel with a proper liquid, practically exhausting the air from the vessel and the liquid by heating the vessel and the contained liquid, then closing the vessel against inclusion of air or liquid from without, and then freezing, substantially as described.

2. The method of producing a refrigerating-body, comprising an air-exhausted holder permanently impervious to intrusion of any extraneous fluid and containing a readily-freezable liquid, which consists in partially filling a suitable vessel with a proper liquid, practically exhausting the air from the vessel and the liquid by heating the vessel and the contained liquid, then closing the vessel against inclusion of air or liquid from without, and then freezing, substantially as described.

3. As a new article of commerce, a body of ice practically devoid of air and relieved from pressure of air, being contained in an exhausted shell or portable holder, substantially as described.

In testimony whereof I affix my signature in the presence of two subscribing witnesses.

GEORGE A. MANWARING.

Witnesses:
 JOSEPH L. LEVY,
 SOPHIA SEKOSKY.